United States Patent [19]

Bendell

[11] Patent Number: 4,507,679

[45] Date of Patent: Mar. 26, 1985

[54] COLOR TV CAMERA WITH FOUR-PORT PRISM

[75] Inventor: Sidney L. Bendell, Riverton, N.J.

[73] Assignee: RCA Corporation, New York, N.Y.

[21] Appl. No.: 450,211

[22] Filed: Dec. 16, 1982

[51] Int. Cl.³ .............................................. H04N 9/04
[52] U.S. Cl. ......................................... 358/55; 358/50
[58] Field of Search .................................... 358/55, 50

[56] References Cited

U.S. PATENT DOCUMENTS 4,249,203 2/1981 Yamanaka ............................. 358/50
4,268,119 5/1981 Hartmann ............................. 358/55

*Primary Examiner*—Richard Murray

*Attorney, Agent, or Firm*—Eugene M. Whitacre; Paul J. Rasmussen; William H. Meise

[57] ABSTRACT

A color television camera includes a color splitting prism and solid-state imagers responsive to different colors. In order to enhance resolution, two offset green-responsive imagers are coupled to prism ports to which green light is propagated and their signals are combined. Because of the different power of the lens for different colors of light, the red and blue images focus at different distances. In order to allow correct focus for both the red and blue images, the red and blue light components are propagated to separate output ports to which individual red and blue-responsive imagers are coupled. The lengths of the red and blue light paths are adjusted to provide proper focus.

6 Claims, 8 Drawing Figures

COLOR TV CAMERA WITH FOUR-PORT PRISM

This invention relates to a color television camera using a four-port color-splitting prism for increasing the resolution of the television signal and for reducing raster and other distortions.

Color television cameras have traditionally used continuous imaging devices such as vidicons in which the imaging surface or screen includes a continuous film which is the equivalent of a distributed capacitance paralleled by a distributed photo-resistance. A television signal is generated by the variable charging of the capacitance as an electron beam is scanned across its surface, causing increased current to flow in a load during scanning of regions in which the photo-resistance is low. Television signals representing different colors are generated by a plurality of such vidicons, each being coupled to an output port of a color-splitting prism. A single lens is coupled to the input port of the prism and focussed onto the screen the vidicons. Commonly, the prism splits image light into red, green and blue (R,G,B) components, which are made so that three vidicons can produce signals representative of red, green and blue light components of the image. There is often a difference in size between the three images focussed onto the R, G and B vidicons, and this is accomodated by adjusting the magnitude of the deflection currents so that the same point on the image is simultaneously scanned by each of the imagers. The resolution of camera tubes can be very good, i.e. in excess of 600 television lines, because the resolution is established by the diameter of the scanning electron beam, which can be sharply focussed at the screen. While vidicons, saticons and like camera tubes are satisfactory, attention has been directed to cameras using low-power solid-stage imagers.

An optical assembly for color television including an (R,G,B) color splitting prism to which solid-state imagers are adhesively fastened is described in U.S. Pat. No. 4,323,918 issued Apr. 6, 1982 in the name of S. L. Bendell. This apparatus takes advantage of the inherently long life of solid-state imagers to make a rigid prism-imager assembly. This patent also describes the use of spacers for controlling the path length in each of the R, G, and B light paths.

A known problem with solid-state imagers is the discrete cells or active regions making up the imager. Current production processes do not adequately produce mass quantities of defect-free high-resolution high-sensitivity imagers.

A known arrangement for increasing the effective resolution of a camera using an RGB color-splitting prism and relatively low-resolution imagers is described in U.S. Pat. No. 4,322,740 issued Mar. 30, 1982 in the name of Takemoto, et al. which involves offsetting the green-responsive imager relative to the red and blue-responsive imagers by one-half pixel or resolution element. For white images, this provides improved resolution, but the resolution for images of one color are not enhanced. Also, the advantage of increased resolution by offsetting pixels requires that the images be of the same size to within about 1/10 of a pixel length (or width). However practical color camera systems, especially those including wide-range zoom lenses, suffer from an optical defect known as lateral chromatic aberration, in which the sizes of the three color images are not the same and furthermore change in size relative to each other as a function of zoom position (focal length) by a factor of up to 10 times the requirement for increase in resolution by offsetting.

The aforementioned problems are addressed in the arrangement of U.S. Pat. No. 4,334,238, in which a color-splitting filter directs the green light from the image equally to two output ports, and the combined red and blue light from the image is directed to a third port. The two green-responsive imagers in this arrangement are coupled to their respective light output ports in such a fashion that the image is relatively offset by one-half pixel. A red-blue color filter is disposed adjacent to the third imager at the third port for allowing the red component of the light to fall on some of the active pixels, while blocking blue, and for allowing blue to fall on the other pixels while blocking red. This arrangement has the disadvantage of poor light sensitivity, color misregistration and requiring a stripe or checkerboard color filter indexed with the pixels of an imager.

SUMMARY OF THE INVENTION

An improved color television camera includes a color-splitting prism having a light input port and including first and second output ports to which a first color light is directed. First and second green-responsive discrete imagers are coupled to the first and second output ports and are relatively offset as to the image for improved resolution. The camera is also responsive to second and third colors of light. A lens assembly is optically coupled to the input port of the prism for focussing the image onto the surfaces of the various imagers. Because of the differences in power of the lens arrangement for different colors of light, the focal points of the second and third colors are not at the same point. This in turn results in color misregistration. The improvement lies in that the color-splitting prism includes separate third and fourth ports to which the second and third light colors are individually directed, and separate third and fourth imagers coupled to their respective ports for responding to the individual second and third colors, thereby making it possible to control the light paths of the second and third colors for achieving focussed operation without color misregistration.

Figures 1A, 1B:
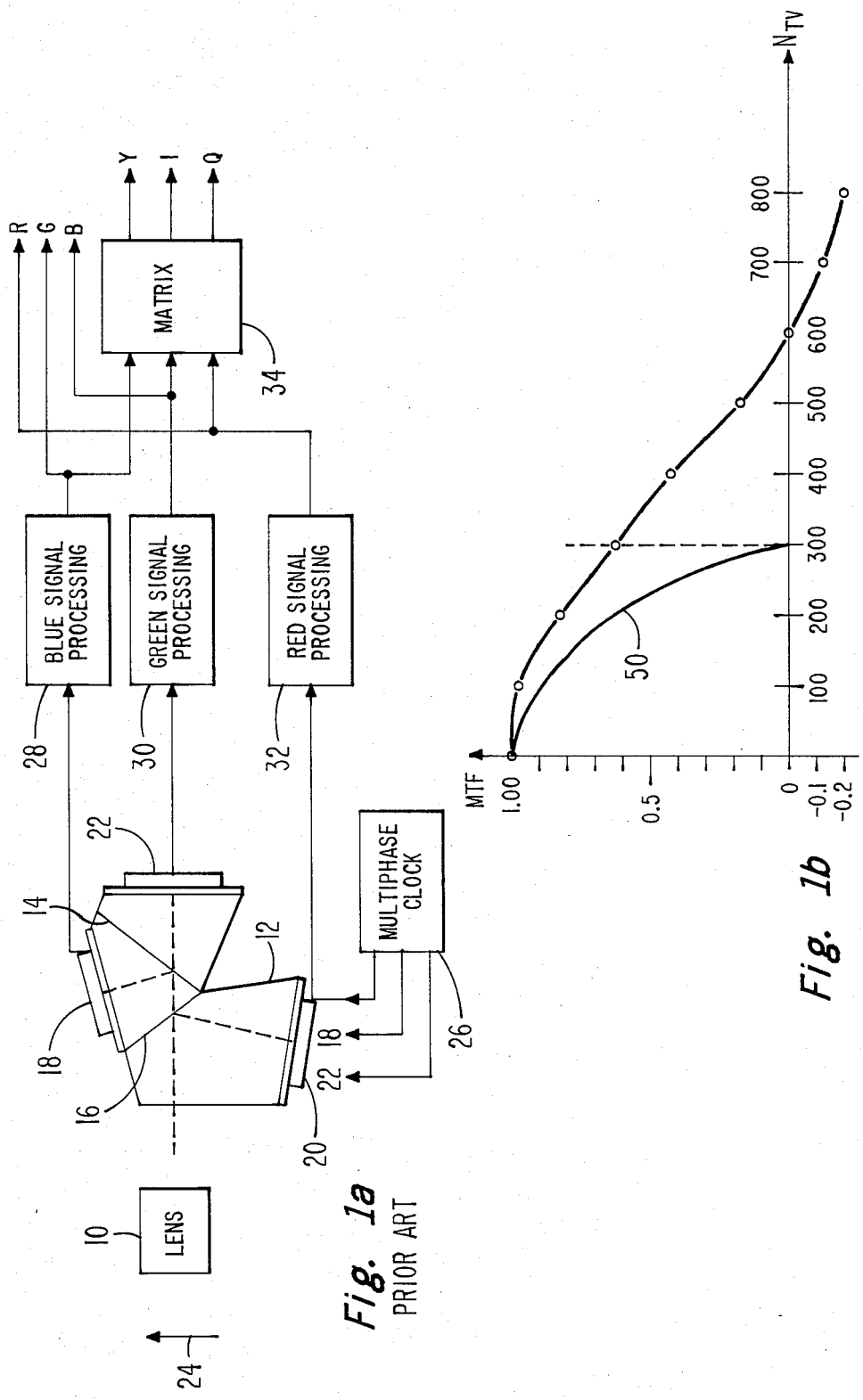
FIGS. 1a and b illustrate generally a prior-art color camera, its modulation transfer function and regions of operation.
Figure 2:
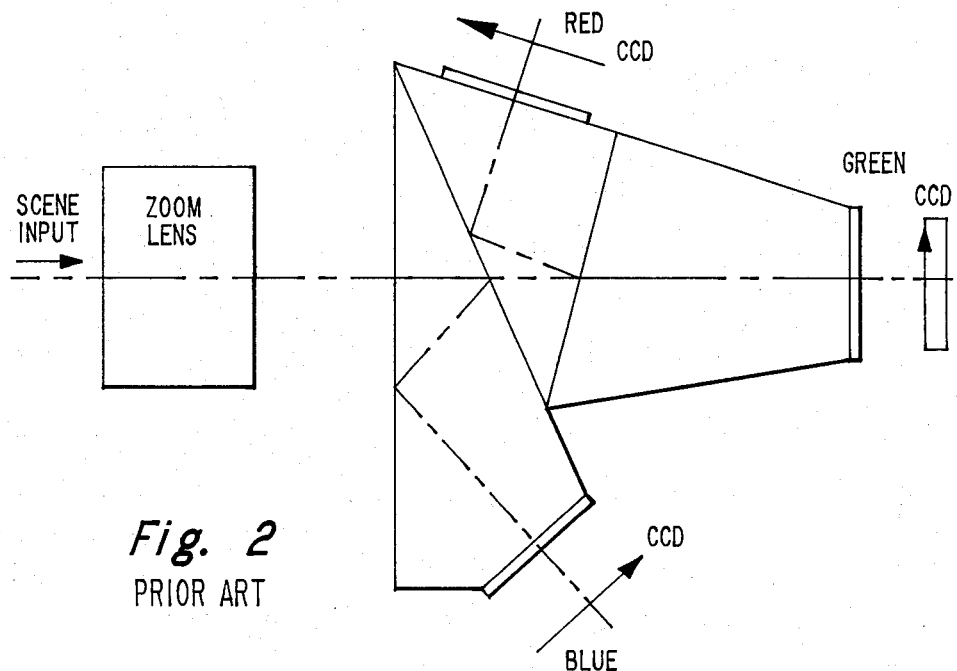
FIG. 2 illustrates to scale a prior-art prism which might be used in an arrangement according to FIG. 1.

The prior-art camera of FIG. 1 includes a lens coupled to an RGB light-splitting prism 12 having light-splitting surfaces 14 and 16 for directing red and blue light components to imagers 18 and 20, while green light from the image illustrated as an arrow 24 is focussed onto green-responsive imager 22. A multiphase clock generator 26 generates a polyphase clock signal for operating imagers 18, 20 and 22 in accordance with known techniques for generating red, green and blue-responsive signals which are applied to signal-processing circuits 28, 30 and 32 where the signals may be filtered, gamma and/or shading corrected, and the like before being applied to an output terminal as RGB signals or being applied to a matrix 34 for generation of Y, I and Q signals.

The modulation transfer function (MTF) which establishes the horizontal resolution for a CCD imager having contiguous pixels of a given size is given by the expression:

$$MTF = \frac{\sin \chi}{\chi} \qquad (1)$$

where MTF is measured in television lines ($N_{TV}$) i.e. the total number of black and white areas per picture height, and $$\chi = \frac{N_{TV}}{1.5 E_H} \times \pi \qquad (2)$$

where $E_H$ is the number of contiguous pixels per picture width. For the arrangement of FIG. 1, the MTF of one imager having 403 contiguous pixels per sensor (picture) width is calculated for a number of different television (TV) lines in the image as

TABLE 1

| $N_{TV}$ | MTF |
|---|---|
| 0 | 1.000 |
| 100 | 0.956 |
| 200 | 0.829 |
| 300 | 0.641 |
| 400 | 0.420 |
| 500 | 0.199 |
| 600 | 0.007 |
| 700 | −0.131 |
| 800 | −0.204 | which is plotted in FIG. 1b.

The sampling or clocking rate of the discrete sensor sites of a solid-state sensor such as a CCD array having contiguous pixels is at the first "zero" of the MTF, i.e. near the crossover point at 600 $N_{TV}$ and for the above example occurs at 604 TV lines. The Nyquist limit well-known from sampling theory states that for a sampled system the input information (i.e. the distribution of light and dark areas of the image) must be limited to a frequency which is half of the sampling frequency. Information content having spatial frequencies greater than half the sampling rate gives rise to anomalous artifacts known as aliasing. In the above example, the information content of the image must be below 300 TV lines to avoid aliasing. Since the information content of the image cannot readily be controlled, it is common in solid-state imager practice to filter the information optically, so as to have the information content at or near zero at the Nyquist limit frequency, which in the example is 300 TV lines. A plot of the filter response is illustrated as 50 in FIG. 1b. Thus, in spite of having an MTF extending to 600 TV lines, sampling considerations limit the response of the FIG. 1 system to 300 TV lines for a 403-sensor-per-line imager. This is not ordinarily considered suitable for exacting applications as in broadcast and ENG (electronic newsgathering).

Figure 3:
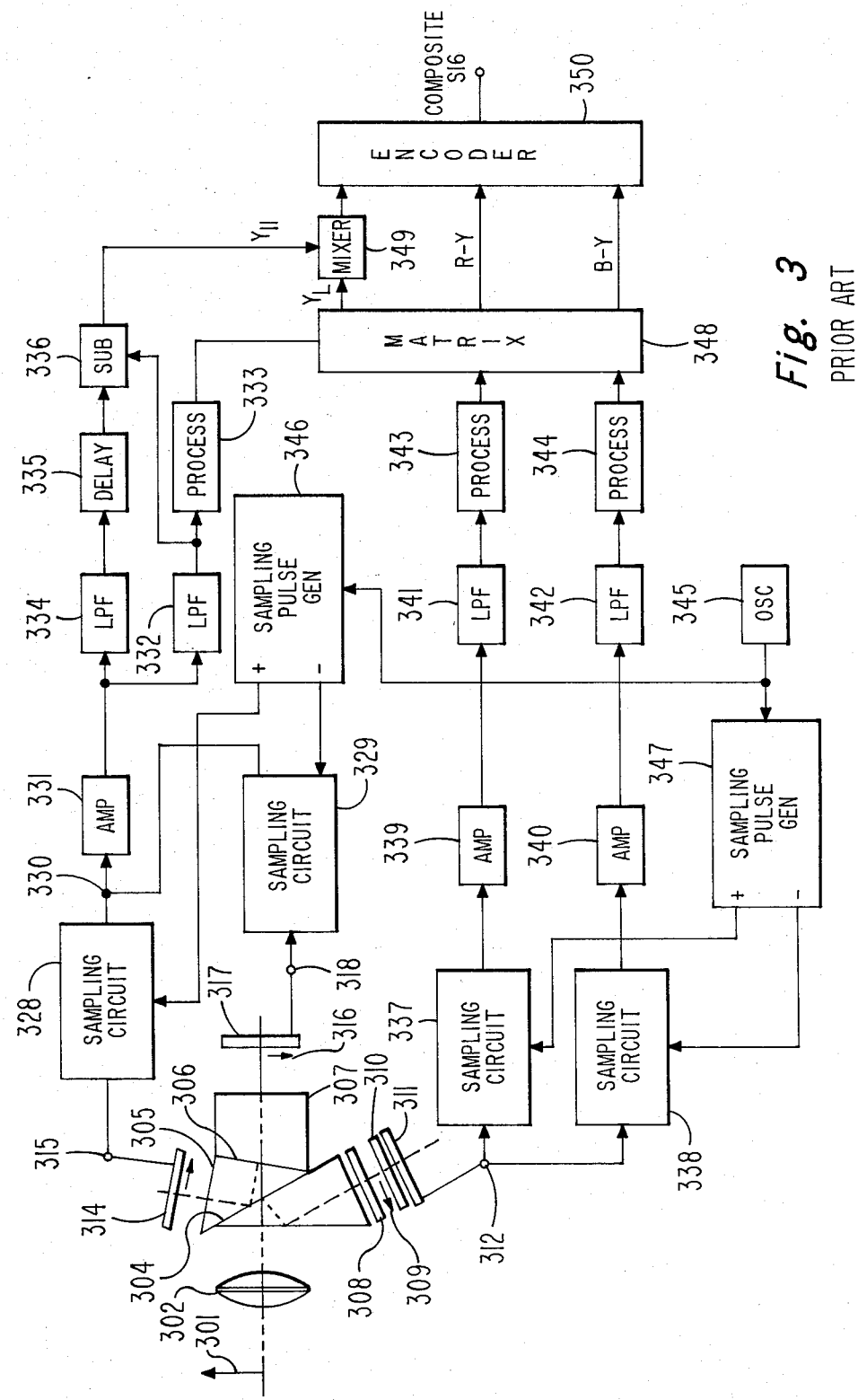
FIG. 3 illustrates generally another prior-art color camera arrangement.

The prior-art arrangement of FIG. 3 uses a lens 302 to focus an image 309, 313, 316 of an object 301 through a beamsplitting prism including blocks 303, 305 and 307. Green light from the object is coupled through boundary surface 304 while red and blue are reflected from 304 and from the front surface, through an optical LPF 308, and red-blue color filter 310 to discrete solid-state imager 311. The green light passing through surface 304 is equally divided by a neutrally reflecting transmitting surface such as a half-silvered mirror 306, with half the green light passing through 306 to imager 317 and half being reflected from 306 and 304 to imager 314. The image at 304 is in the same sense as that at imager 317, having been reflected twice. Imagers 314 and 317 are physically positioned with respect to the images so that the image falls on imager 314 at a point ½ pixel displaced from that on imager 317 upon which the corresponding portion of its image falls. This doubles the effective number of pixels, although without an increase of sensitivity because of the splitting of the light, whereby half the number of photons is available for each imager. Imagers 314 and 317 produce mutually-out-of-phase signals which are sampled by 328 and 329, respectively, and mixed at 330. The mixed signal is amplified by 331. The amplified green-representation signal is low-pass filtered by filter 332 having a cutoff below 2 MHz, and by a filter 324 having a much higher cutoff frequency. The below-2 MHz component of green is applied as an input to matrix 348 for combination with R and B signals to produce $Y_L$, a low-frequency luminance signal. The relatively high frequency green signal from filter 334 is delayed to compensate for the pixel offset, and the low-frequency green is subtracted therefrom to produce green highs ($Y_H$) which are applied to an adder 349 to generate luminance. The alternate R, B, R, B signals from imager 311 are alternately sampled by sampler 337, 338 to produce separate R and B signals, which are filtered and processed before application to matrix 348 for producing $Y_L$ and R-Y, B-Y for application to a composer or encoder 350. This arrangement allows the luminance frequency to extend to approximately the $N_{TV}$ established by the MTF for the number of picture elements in each green imager.

However, the sensitivity of the color-responsive imager is degraded, because of the losses in color filter 310, and the resolution also suffers because the color imager effectively has only half the actual number of discrete sensor elements for each color. Furthermore, problems of color misregistration also exist because the power of lens 302 is different for red and blue light, so the red and blue images 309 falling on imager 311 are not congruent or are out of focus. That is to say that the red and blue images do not focus at the same point.

FIG. 4 illustrates a prism according to one aspect of the invention. In FIG. 4, polychromatic light from a lens (not shown) impinges on the left surface 410 of the prism assembly and passes through block 412 to blue-reflecting surface 414. The reflected blue light travels along a path 416 back to the front surface 410, where it is totally reflected so as to propagate along path 418 to a blue output port 420. A blue trim filter 422 may be used to correct the chromaticity of the light in known fashion. The red and green light components pass through surface 414, and arrive at surface 424 at which the red components are reflected so as to take a path 426, 428 to a red output port 430. A red trim filter 432 may be used as necessary. The green light components pass through surface 424 to a 50% neutral reflector or half-silvered mirror 434. At mirror 434, half the green light is reflected to a green output port 436 and half is transmitted to a second green output port 430. Solid-state imagers (not shown) may be coupled by suitable spacers to the four output ports.

Figure 5:
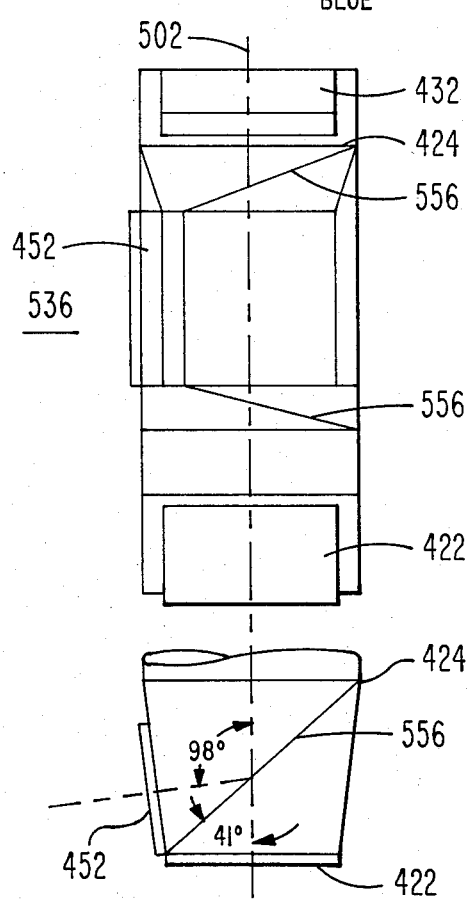
Figure 4A:
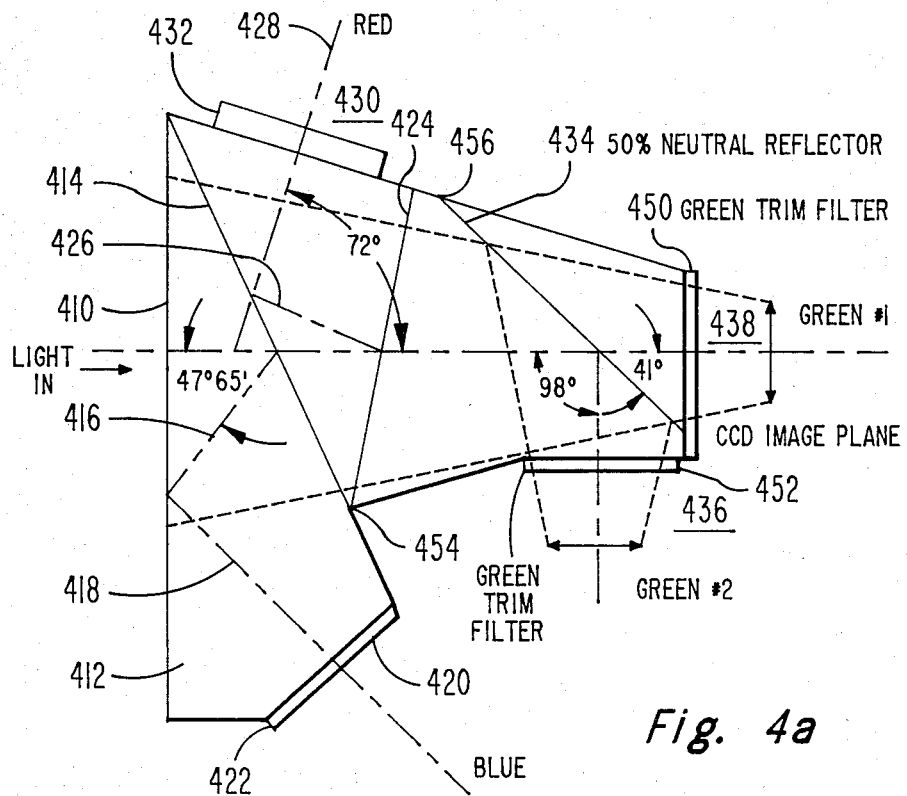
FIGS. 4a and b and 5 illustrate prisms in accordance with another aspect of the invention.
Figure 4B:
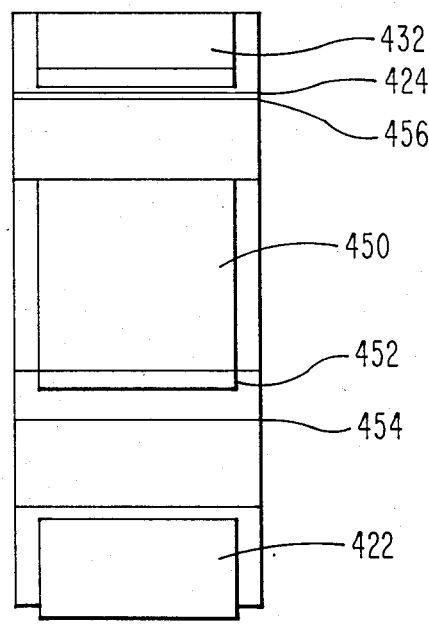

As illustrated in FIG. 4a, the prism has a plane of symmetry parallel with the plane of the paper. FIG. 4b is a view of the prism of FIG. 4a looking towards green port 438. In an actual camera, the location of the green #2 and output port 436 is inconvenient because it tends to be crowded by adjuncts to the remaining imagers. FIG. 5 illustrates a prism in accordance with an aspect of the invention in which green port #2 is physically orthogonal to the position illustrated in FIG. 4a. That is, trim filter 452 (and the green output port associated therewith) is not symmetrically divided by the plane of symmetry 502 corresponding with the plane of the paper in FIG. 4a. Rather, the associated green output port allows light to exit substantially orthogonally to plane 502. This allows a green responsive imager to be positioned relative to the port in a manner allowing more convenient routing of conductors and positioning of modules.

Figure 6:
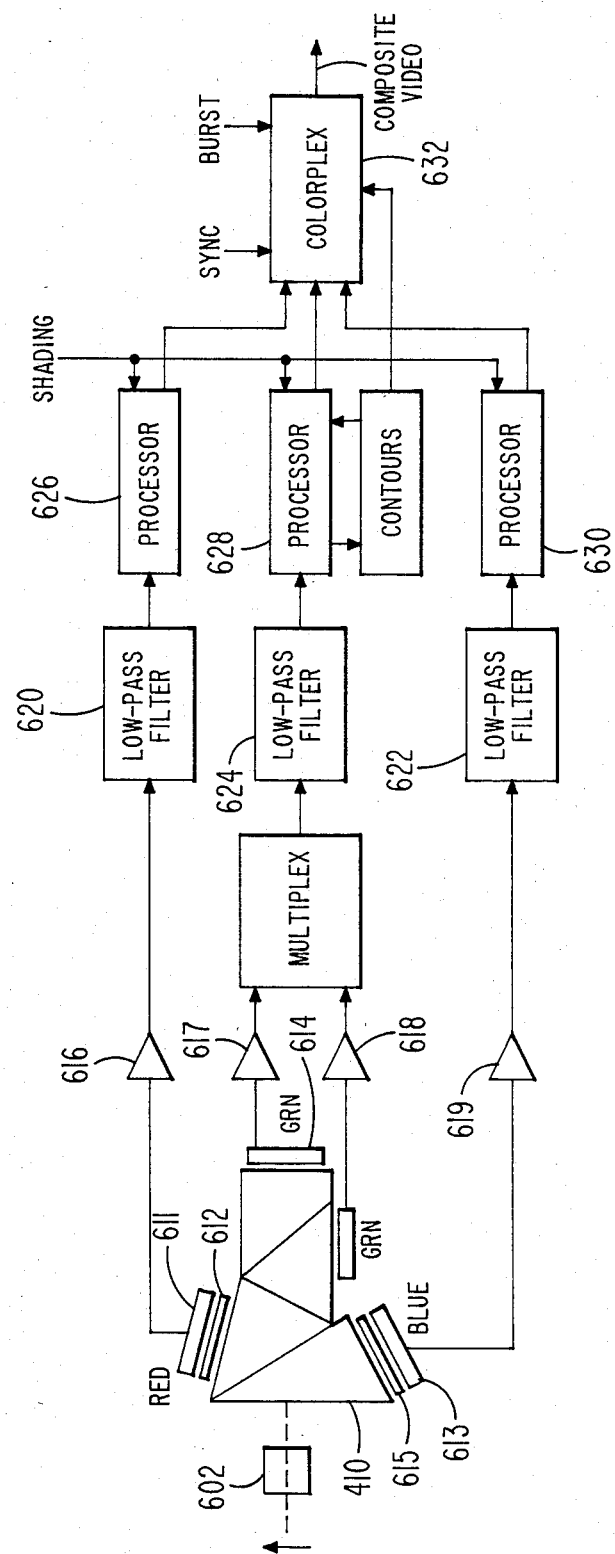
FIG. 6 illustrates a color camera arrangement according to an embodiment of the invention.

FIG. 6 illustrates in simplified block diagram form a color camera embodying the invention. In FIG. 6, a four-port prism 410 is coupled to a lens 602 and to a pair of green-imagers 614 and 617. Prism 410 is also optically coupled to a red-responsive imager 611 by way of a spatial low-pass filter 612, and to a blue-responsive imager 613 by way of a spatial low-pass filter 615. Each imager is coupled to the input terminal of an amplifier 616-619. The red and blue representative signals are applied to low-pass filters 620, 622 for removing clock components. The two green-representative signals are coupled to a multiplexer for processing the green signals generally in accordance with the prior art to produce a high-resolution green signal. The clocking transients are removed from the high-resolution green signal by a low-pass filter 624. The R, G and B signals at the outputs of filters 620, 624 and 622 respectively, are applied to conventional signal processors 626, 628 and 630 respectively, which perform gamma, shading and other corrections in known fashion and which apply the processed signals to a composer or colorplexes 632. Colorplexer 632 accepts sync and burst signals and the R, G and B signals for forming a standard composite NTSC, PAL or other signal. A contour signal generator 634 may be coupled to green processor 628 for generating contour signals by which the detail may be enhanced.

What is claimed is:

1. An improved television camera arrangement comprising:
    a color splitting prism including a light input port and first and second green light output ports
    first and second discrete imagers coupled to said first and second output ports of said prism for responding to green light, said first and second imagers being oriented relative to said first and second ports in a manner so as to offset by one-half of one picture element relative to each other the images imaged onto the surfaces of said first and second imagers for providing improved resolution of said green image;
    further imaging means responsive to red and blue colors;
    focussing means optically coupled to said input port of said color splitting prism for focussing a scene onto the surfaces of said imagers, said focussing means causing the focal points of said blue and red images to differ from each other,
    wherein the improvement lies in that
    said color splitting prism includes a third output port to which the blue components of said image are coupled, and a fourth output port to which the red components of said image are coupled; and in that
    said further imaging means comprises a third discrete imager coupled to said third output port and a fourth discrete imager coupled to said fourth output port whereby the path lengths to said third and fourth imagers may be adjusted for correcting said focus of said red and blue images.

2. A camera arrangement according to claim 1 where said first and second green output ports have a common plane of symmetry.

3. A camera arrangement according to claim 2 wherein said focussing means comprises a zoom lens.

4. A camera arrangement in accordance with claim 2 wherein said third and fourth output ports have a common plane of symmetry with said first and second output ports.

5. A camera arrangement according to claim 1 wherein said first, third and fourth output ports have a common plane of symmetry and said second output port produces light propagating substantially orthogonally to said plane of symmetry.

6. A camera arrangement according to claim 5 wherein said focussing means comprises a zoom lens.

* * * * *